United States Patent [19]

Lagadec

[11] Patent Number: 5,596,951
[45] Date of Patent: Jan. 28, 1997

[54] GRATED FLOORBOARD FOR ANIMAL HOUSING

[75] Inventor: Jean Lagadec, Le Relecq-Kerhuon, France

[73] Assignee: Galvelpor SA, France

[21] Appl. No.: 415,486

[22] Filed: Apr. 3, 1995

[30] Foreign Application Priority Data

Jul. 1, 1994 [FR] France ................... 94 08372

[51] Int. Cl.[6] .................................. A01J 1/00
[52] U.S. Cl. ................................ 119/525
[58] Field of Search .................. 119/27, 28

[56] References Cited

U.S. PATENT DOCUMENTS

| | | | |
|---|---|---|---|
| 39,283 | 7/1863 | Garlick | 119/28 |
| 592,960 | 11/1897 | Brion | 119/28 |
| 813,317 | 2/1906 | Murray | 119/28 |
| 1,560,160 | 11/1925 | Hebert | 119/28 |
| 2,856,897 | 10/1958 | Galinsky et al. | 119/28 |
| 3,457,901 | 7/1969 | Abraham | 119/28 |
| 3,587,528 | 6/1971 | Lake | 119/28 X |
| 4,207,837 | 6/1980 | Schwartau et al. | 119/28 X |

FOREIGN PATENT DOCUMENTS

| | | |
|---|---|---|
| 0161717 | 5/1985 | European Pat. Off. |
| 1535714 | 6/1967 | France |
| 1068503 | 2/1959 | Germany |
| 2008166 | 2/1970 | Germany |

*Primary Examiner*—Thomas Price
*Attorney, Agent, or Firm*—Laff, Whitesel, Conte & Saret, Ltd.

[57] ABSTRACT

The present invention relates to an animal box floor comprising facilities for the evacuation of excrement formed on the surface of the said floor (1), the said floor (1) being mounted above the facilities, such as a ditch, for the gathering of the excrement. According to the invention, the arrangement is characterised by the fact that the said facilities are comprised of at least a section of the said floor (1) which is inclined in relation to the surface of the said floor (1), towards an evacuation orifice (23) for the excrement, located in an approximately vertical plane and emptying onto the said facilities for gathering the excrement.

8 Claims, 4 Drawing Sheets

FIG. I

GRATED FLOORBOARD FOR ANIMAL HOUSING

FIELD OF THE INVENTION

This invention relates to a compartment floor for the use of animals, of a type which includes resources for the evacuation of excrement deposited on the surface of the floor, the floor being mounted above facilities, such as ditch, for collecting the excrement. A floor design such as this is particularly useful in a piggery. The means of evacuation facilitate the removal of pig excrement, without human intervention, when part of this excrement is not drained off in the collection facilities.

BACKGROUND OF THE INVENTION

Floor designs provided with facilities allowing for the removal of pig excrement are already known. Such facilities usually consist of a trap which is formed in the floor, and which is designed to be raised when required in order for the excrement to be evacuated. When the floor designs fitted with such evacuation facilities are installed, for example, in birthing boxes, they may sometimes present a hazard for sows and piglets. The trap, when open, may cause the piglets to fall through, or may injure the lower members of sows. In addition to this, such techniques for the evacuation of excrement require daily manual intervention by humans in order to open them.

An attempt has already been made to remedy these disadvantages in part, by using a grating arrangement, as described in German Application DE-A-4 010 817. A lateral section pivots in relation to one of its edges, and thus forms an orifice. The orifice which is created in this manner, on the lateral edges of the grating, avoids the risk of injury to the sows injuring their lower members, since they do not reach as far as this point. However, this kind of a structure does not prevent piglets from falling through if the lateral section is not repositioned in its closed position.

SUMMARY OF INVENTION

An object of the present invention is to avoid the disadvantages cited above, by a floor design which facilities the removal of excrement while reducing the risks of injury to the sows, and, at the same time, reducing the risk of piglets falling through, while still facilitating the removal of excrement.

To this end, a floor design according to the invention is characterized by the facilities for evacuation being formed by at least a section of the floor, which is inclined from the surface of the floor towards an orifice for the evacuation of the excrement, in a plane which is perceptibly vertical and which opens into the means of recovering the excrement.

Due to the inclination of the section of the floor, the excrement can be easily evacuated from the floor surface, with the aid, for example, of a brush or a rake, via the orifice and towards the trench which is normally located beneath the floor. The orifice is located in a plane which is approximately vertical; therefore, the animals are not at risk of injuring the lower members of the pigs, or of allowing the piglets to pass through the orifice. The inclined section of the floor is a grating, provided at the rear of the area of the floor normally intended for the animal.

In order to avoid the risk of the newly-born piglets falling through the orifice, a provision has been made for the section to be able to pivot. It is thus able to adopt, on the one hand, its inclined position, and, on the other, to assume a position in which it is located in the plane of the floor, particularly during periods in which the newly-borne piglets still have an anatomical shape and size which sets them at the risk of passing through the evacuation orifice. The grating comprises, on one of its edges, an axis which is located in the plane of the floor, and is mounted so as to pivot on the floor.

The invention relates likewise to a floor of the animal box floor type for sows and piglets, which comprises a first assembly formed of a number of gratings, and to accommodate the sow, and at least one second assembly consisting of a number of gratings and to accommodate the piglets.

According to another characteristic of the invention, the inclined section is located in the first section, at the rear of the first assembly for the sow.

The invention likewise relates to a floor of a type such as that just described, but in which the first grating assembly and the second grating assembly are fixed on at least one beam, which is fitted with the bars of the grating.

When the first assembly and the second assembly are located at the same level, the bars of the grating on the beam are straight.

In the situation in which if the first assembly and the second assembly are located at different levels, the bars of the gratings of the beams are curved in such a way as to follow the levels of the grating assemblies.

BRIEF DESCRIPTION OF THE DRAWINGS

The characteristics of the invention mentioned above, as well as of others, will be demonstrated more clearly when the following description is read of a preferred embodiment, the description being related to the appended drawings, in which.

DETAILED DESCRIPTION OF THE INVENTION

Figure 1:
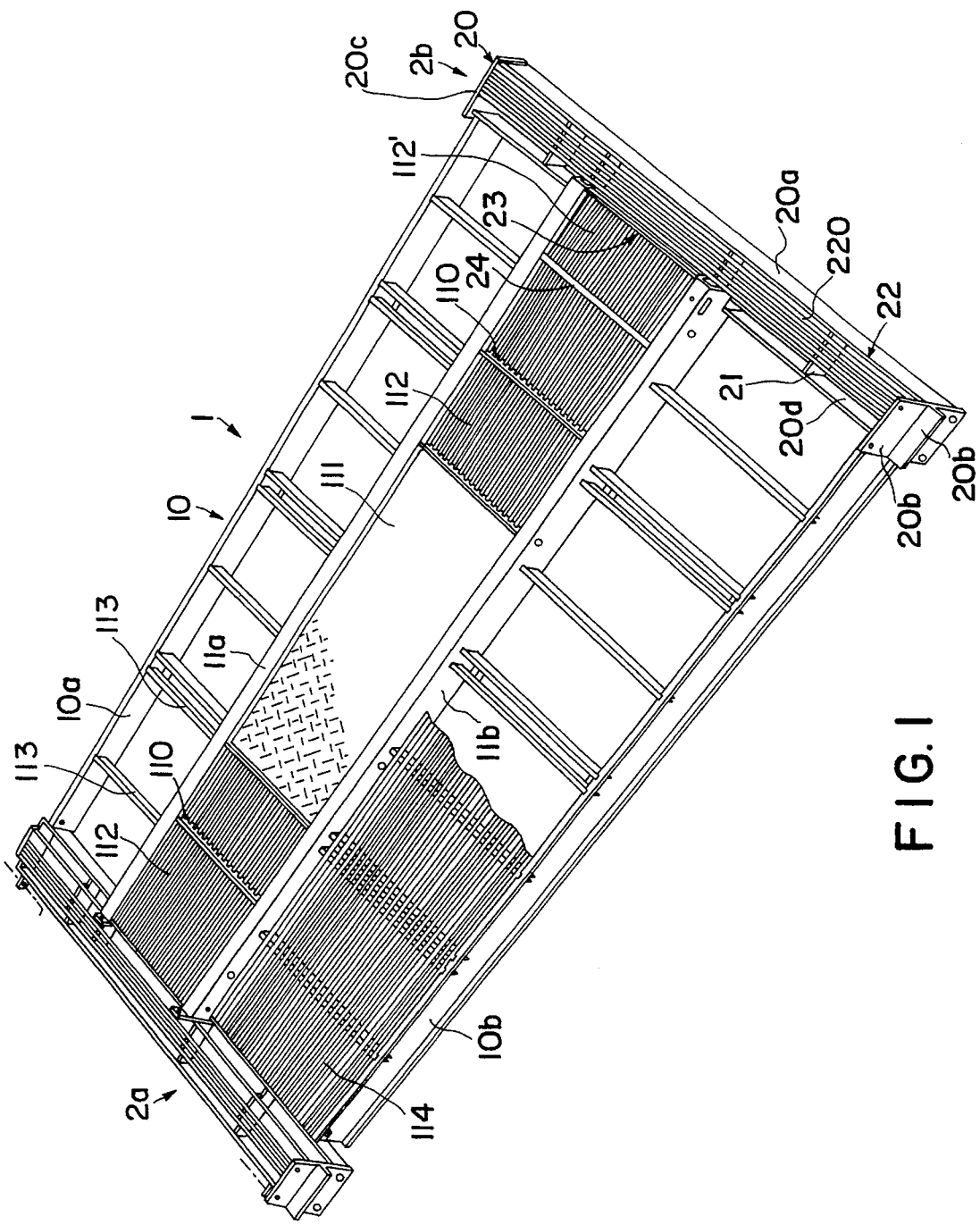
FIG. 1 is a view of the assembly in perspective of a floor for an animal box according to the invention.

The floor 1 of the present invention, shown in perspective in FIG. 1, is formed from a frame 10, which is approximately rectangular, the transverse walls of the frame 10 being formed of beams 2. The longitudinal walls are formed of lateral chord elements 10a and 10b, secured by their ends to the beams 2. Two central chord elements 11a and 11b located inside the frame 10, parallel to the chord elements 10a and 10b, rest on the beams 2 by their ends. Transverse elements 110 are mounted perpendicularly between the chord elements 11a and 11b. The transverse elements 110, on the one hand, support a metallic panel 111 in the center, provided in order to support the sow, and, on the other hand, also support metallic gratings fixed on each side of the panel 111.

The gratings 112 and the panel 111 form a first assembly which is intended to accommodate the sow. Between the lateral chord element 10a and the central chord element 11a, and between the lateral chord element 10b and the central chord element 11b, a number of transverse elements 113 are arranged parallel to one another in order to support the gratings 114, made, for example, of plastic material. The gratings 114 form a second assembly intended to accommodate the piglets.

Since not all animal boxes have the same shape, the lateral chord elements 10a and 10b of the floor 1 are not necessarily parallel to one another, or parallel to the central chord elements 11a and 11b.

The beams 2 are formed of a rectangular elongated frame 20, the walls of which are formed of metallic panels 20a, 20b, 20c and 20d. Placed perpendicularly between the longitudinal panels 20a and 20d are transverse elements 21, parallel to one another, and provide, in order to support the upper section 22 of the beam 2. This forms a grating element, formed, for example, of four straight bars 220, triangular in section, parallel to one another, and extending the entire length of the beam 2. Since not all animal boxes are of the same length, it is possible to add grating bars 220 in such a way as to extend the beams 2. Each beam 2 rests at one end, directly on a wall (not shown), and, at the other end, on another wall (likewise not shown) by means of a panel 20b secured to one of the ends of the beams 2.

A grating 112', located behind the area of the floor 1 normally occupied by the animal, adjacent to the rear beam 2b, is slightly inclined in such a way as to drop down from the side of the beam 2b. The grating 112' has a first side which is located in the plane of the floor 1. Along the length of the opposite side, an evacuation orifice 23 is formed, which is located on an approximately vertical plane, as shown in detail in FIG. 2. Excrement can be easily evacuated from the upper face of the floor 1, via the orifice 23 with the aid, for example, of a brush or rake. The evacuation is towards the trench which is normally located beneath the floor 1 and onto which the evacuation orifice 23 empties. In the embodiment shown, the grating 112' is capable of pivoting under the action of any appropriate means (not shown), about an axis which is located in the plane of the floor 1. It may accordingly adopt, on the one hand, the inclined position shown in FIG. 2, and, on the other hand, the horizonal position shown in FIG. 3. To do this, it comprises, on one of its edges, an axis 24, which is located in the plane of the floor 1, and which is mounted so as to pivot, for example, in holes provided on the floor 1. Devices (likewise not shown) are provided which allow the grating 112' to be locked into either one or the other of these positions.

Figure 2:
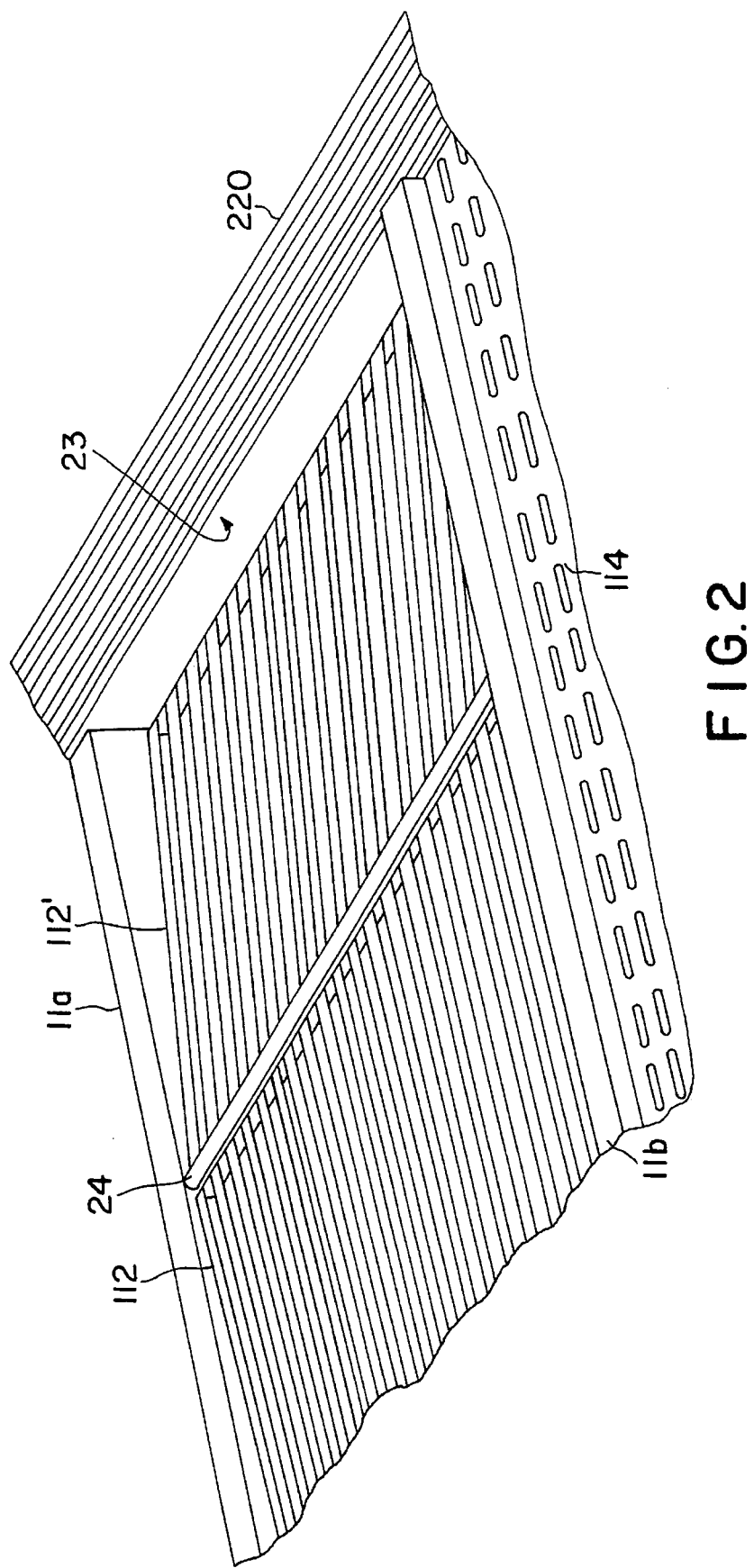
FIG. 2 is a view of the part of the floor, which forms the evacuation orifice for the excrement in an inclined position.
Figure 3:
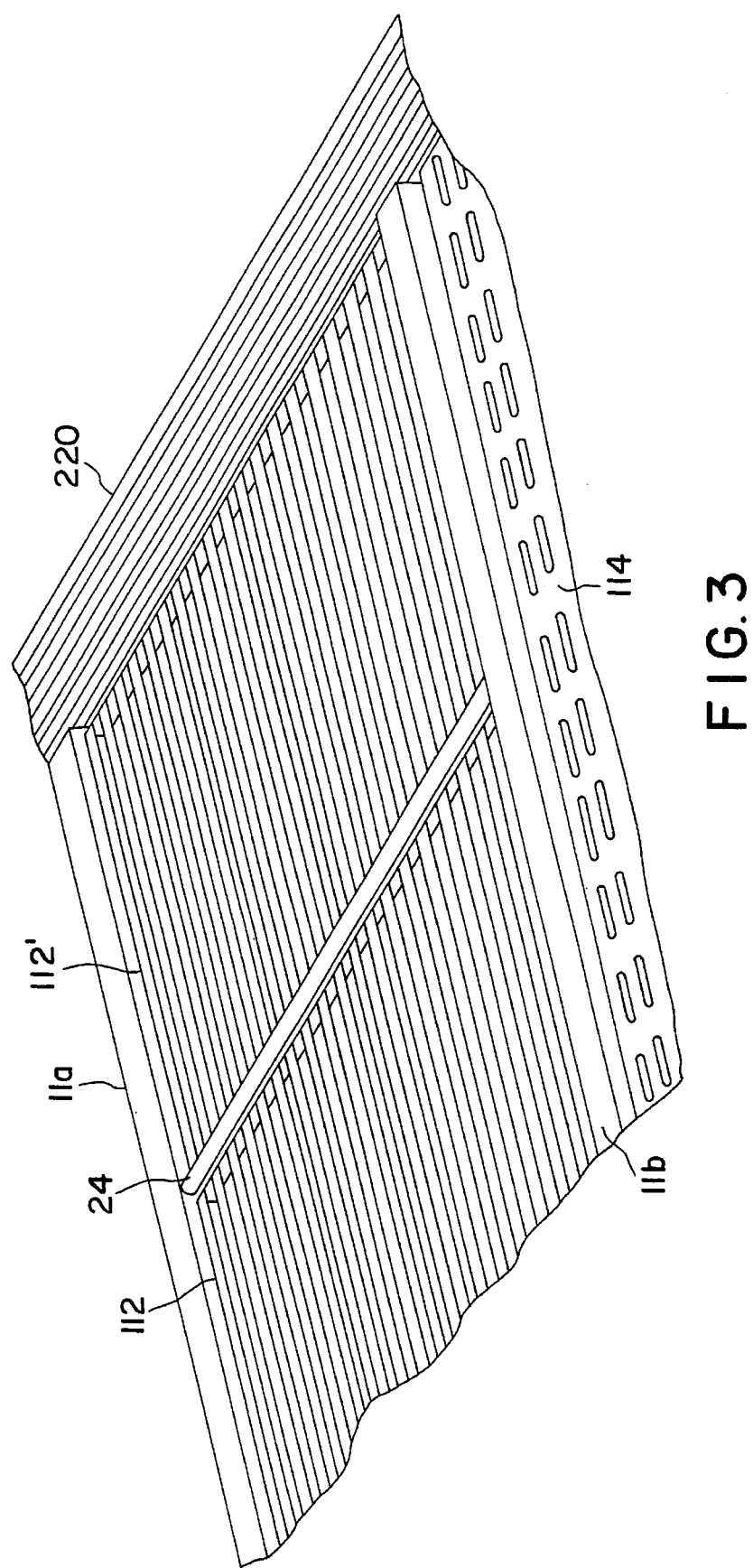
FIG. 3 is a view of the part of the floor, which forms the evacuation orifice for the excrement, in a horizontal position.

It may be noted that the normal position of use of the floor 1 is that described in FIG. 2, where the grating 112' is inclined. The floor according to the invention accordingly does not require any manual intervention for opening it, to the extent that the orifice 23 is always open and allows for excrement to be removed. In addition, since the orifice 23 is formed in a vertical plane, there is no risk of sows injuring themselves. Moreover, due to the slight opening movement of the orifice 23 for the satisfactory removal of the excrement, there is no risk of the piglets falling into said orifice 23. In other words, it is only momentarily, when the sows are lowered into the box, that the horizonal position of the grating is used as shown in FIG. 3. This makes it possible to prevent the newly-born piglets from falling through the orifice 23 when their anatomical shape and size still exposes them to such a risk. The horizontal position is likewise used momentarily in other instances, to introduce a pig into a box provided with such facilities, in order for the orifice not to impede the pig's movement. In this way, the floor from the present invention may be used for any type of box, whether for giving birth, gestation, or other function.

Figure 4:
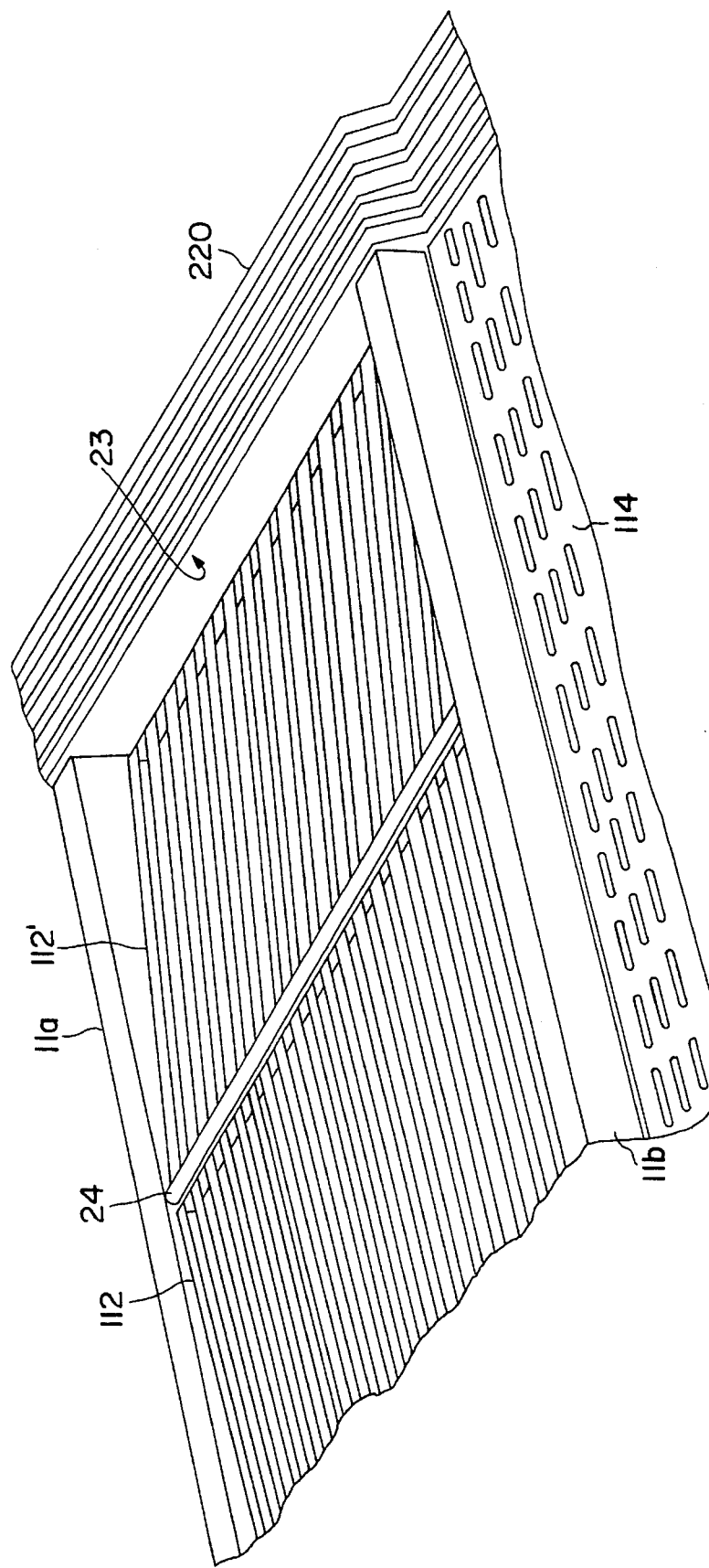
FIG. 4 is a view of the part of the floor, which forms the evacuation orifice for the excrement, the floor being formed of several areas of different levels.

In FIG. 4, a floor is shown for a birthing box. With this type of floor, the grating 112 and the panel 111 are reserved for the sow, while the gratings 114 are reserved for the piglets. The gratings 114 are accordingly in general at a level lower than that of the gratings 112. The result of this is that, in order not to obstruct the aperture 23, which would be the case if the bars 220 were straight and at the level of the gratings 114, the bars of the grating 220 of the beams 2 are curved in a manner which follows the different levels of the floor 1. By contrast, with FIGS. 1, 2 and 3, the gratings 112 and 114 are at the same level. There, the result is that the bars 220 are straight. While the description may relate to a floor of a box for sow and piglets, the invention can apply equally to any type of animal box.

I claim:

1. A floor for an animal box comprising facilities in a form of a ditch for removal of excrement from an upper surface of said floor (1), said floor (1) being mounted above the facilities, said facilities being formed in at least one section (112') of said floor (1), inclined grate mean having one end extending from the surface of said floor (1) towards a vertical orifice (23) at an opposite end of said grates, said orifice providing an exit opening for the evacuation of the excrement, and means accessed via said orifice for emptying said excrement onto collection facilities.

2. A floor for an animal box according to claim 1 wherein the inclined grate means is hinged on one end remote from said orifice to the floor area (1), normally occupied by an animal.

3. A floor for an animal box according to either one of the claims 1 or 2, wherein the inclined grate means is capable of pivoting between an inclined position forming said orifice and a horizontal position which is located in the plane of said floor (1).

4. A floor for an animal box according to claim 3, wherein included grate means said has an axel (24) mounted on said one end to form a pivot pin in the plane of the said floor (1).

5. A floor for an animal box according to either one of the claims 1 or 2 wherein the floor is a type of a floor provided for sows and piglets, said floor further comprising a first assembly comprising a number of gratings (112) for accommodating the sow, and at least one second assembly comprising a second number of gratings (114) for accommodating the piglets, said inclined grate means being located in said first assembly.

6. A floor according to claim 5, wherein the inclined grate means is located at a rear of the first assembly for accommodating the sow.

7. A floor according to claim 6, further comprising a frame having at least one beam element (2) at an end of said floor, said beam element (2) extending past the first assembly gratings (112) and the second assembly gratings (114) which are secured to said at least one beam element (2), gratings a plurality of grating bars (220) extending past and on the same level as said first assembly (112) and said second assembly (114), the bars of the grating (220) being straight.

8. A floor according to claim 6, further comprising a frame having at least one beam elements (2) at an end of said floor, the first assembly gratings (112) and the second assembly gratings (114) being secured on at least one of said beam elements (2), a plurality of grating bars (220) extending past the first assembly (112) and the second assembly (114) which are located at different levels, the grating bars (220) of the beams (2) being curved to follow the levels of the said grating assemblies (112, 114).

* * * * *